Dec. 31, 1968 C. A. GOFFE ET AL 3,419,719
X-RAY FILM PACK CONTAINING ABSORBABLE GAS AND MEANS
FOR ABSORBING SAID GAS
Filed July 19, 1965

CHARLES A. GOFFE
ROBERT E. STAUFFER
INVENTORS

BY

ATTORNEYS

United States Patent Office 3,419,719
Patented Dec. 31, 1968

3,419,719
X-RAY FILM PACK CONTAINING ABSORBABLE GAS AND MEANS FOR ABSORBING SAID GAS
Charles A. Goffe and Robert E. Stauffer, Rochester, N.Y., assignors to Eastman Kodak Company, Rochester, N.Y., a corporation of New Jersey
Filed July 19, 1965, Ser. No. 473,043
4 Claims. (Cl. 250—68)

ABSTRACT OF THE DISCLOSURE

An X-ray film pack and process provide intimate contact between a sheet of material for recording X-ray radiation and an X-ray intensifying screen when an enclosure, filled with an absorbable gas and containing such X-ray radiation recording material and screen, also contains a rupturable container having therein a material which absorbs the said gas. When the rupturable container is ruptured, gas within the film pack is absorbed and atmospheric pressure forces the walls of the enclosure against the recording material and X-ray screen thereby causing desired intimate contact.

This invention relates to X-ray film packs, and more particularly to X-ray film packs in which an intensifying screen is held in intimate contact with the film for recording X-ray radiation. It also relates to means and processes for providing good contact between intensifying screens and X-ray radiation sensitive films.

As used herein, the term "X-ray film pack" or "X-ray ready pack" refers to a photographic element such as a sheet or film suitable for recording X-ray radiation, an overlying X-ray intensifying screen and a light-tight enclosure for the film and screen.

It is known that the image quality of an X-ray film is higher when an intensifying screen is positioned between the film and the object to be X-rayed. It is also known that the image is further improved by placing intensifying screens on both sides of the film. The screens improve the image initially by increasing exposure speed by the emission of electrons and to some degree fluorescent X-rays, secondly by increasing the contrast of the subject matter on the film by absorbing scattered X-rays and intensifying the primary X-rays, and also by increasing subject contrast by intensifying the primary radiation more than the scattered radiation.

It is further known that in order to obtain the advantages from the use of intensifying screens, the screens should be in intimate contact with the film. Creating and sustaining such contact has been a major problem in ready pack X-ray film units. This invention provides a novel means for establishing and maintaining good contact between the screen and the film.

One object of this invention is to provide novel X-ray ready packs having intimate contact between the film and intensifying screen. Another object of this invention is to provide a novel process for intimately contacting the film and intensifying screen in X-ray ready packs. A further object of this invention is to provide an X-ray film pack containing means for providing and maintaining intimate contact between the film and the intensifying screen. Other objects of the invention will be apparent from this disclosure and the appended claims.

In one embodiment of this invention, an X-ray film pack is provided which includes a sheet of material for recording X-ray radiation, an X-ray intensifying screen overlying the radiation-sensitive sheet and an enclosure for the sheet and screen which is opaque to actinic radiation and at least relatively impervious to ambient gases, the film pack containing an absorbable gas and a rupturable container having therein an absorbent for the gas. X-ray film packs in accordance with this invention may be employed in the conventional manner by rupturing the container and allowing the absorbent material to absorb the gas to provide a vacuum within the package. Atmospheric pressure then forces the walls of the package against the intensifying screen and into intimate contact with the radiation sensitive element. The element then may be exposed and processed in the customary manner.

In another embodiment of this invention, at least a partial vacuum is created in X-ray film packs having a sheet of radiation sensitive material and an overlying intensifying screen, both screen and film being in a flexible enclosure. A sufficiently low pressure should be provided within the enclosure to permit normal atmospheric pressure to force the enclosure against the screen and press it into contact with the film.

In another embodiment of this invention, a process is provided for obtaining good contact between an intensifying screen and a radiation sensitive element enclosed within an opaque, gas impervious envelope which is filled with an absorbable gas, the envelope also containing a rupturable container having therein an absorbent for the gas. The process involves rupturing the container, which causes the gas to be absorbed thereby creating at least a partial vacuum within the envelope. Atmospheric pressure forces the screen into intimate contact with the radiation sensitive film. In a variation of this aspect of the invention, the absorbent may be placed in the envelope before, during or after the absorbable gas is introduced in the container, and the enclosure sealed as soon as possible thereafter. This eliminates the need for using a rupturable container.

Advantageously, the enclosure for the intensifying screen and radiation sensitive element employed in the invention is flexible and opaque to visible radiation. The enclosure preferably is made from material which is relatively impervious to gases. Suitable materials include plastics and paper coated or laminated with polyolefins. It should be noted that it is unnecessary for the package to be composed of materials which are completely impervious to gases over long periods of time, since in the operation of the invention, it is often necessary for the package to hold the reduced pressure for only relatively short times, such as shortly before and during exposure. It is only required that the intensifying screen maintain close contact with the radiation sensitive element at the time of exposure.

Any X-ray radiation sensitive material or element may be used in this invention, such as any of the silver halide emulsions known in the art which are suitable for recording X-ray radiation. The X-ray radiation sensitive element is preferably a support having coated on at least one side thereof a silver halide emulsion, such as a high contrast gelatin silver bromoiodide X-ray emulsion. In preferred embodiments, both sides of the support are coated with an X-ray sensitive silver halide emulsion. The invention, however, is broadly applicable to any suitable material on which X-ray radiation may be recorded imagewise, the material advantageously being in the form of a flat sheet. The supports on which the radiation sensitive material is coated preferably is a flexible support, such as a polyester, e.g., polyethylene terephthalate, a cellulose ester such as cellulose triacetate or other suitable film bases. Rigid supports may also be employed, such as glass supports.

This invention is operable with any suitable X-ray intensifying screen. Examples of suitable intensifying screens include lead foil, supports having coated thereon a phosphor, such as calcium tungstate, lead powder or barium lead sulfate dispersed in a suitable binder such as a copolymer of acrylic acid with an alkyl acrylate, e.g., ethylacrylate;

polyvinyl alcohol; or, aqueous ethyl alcohol soluble nylon. Advantageously, the intensifying screens are flexible, although rigid screens are operable in the invention. In preferred embodiments, the intensifying screen is placed on both sides of the X-ray radiation sensitive element, having radiaton sensitive material coated on both sensitive material. In one convenient form, the X-ray intensifying screen is folded and a radiation sensitive element, having radiation sensitive material coated on both sides of a support, is placed between the two folded flaps of the intensifying screen in such a manner that the screen completely covers all the radiation sensitive material.

In preparing the film packs and carrying out the processes of the invention, the enclosure may be filled with any suitable gas which is capable of being absorbed and which does not exert any detrimental effects on the radiation sensitive element. Carbon dioxide has been found to be highly suitable. Satisfactory absorbents for carbon dioxide include alkaline materials, preferably non-liquid, such as calcium hydroxide, barium hydroxide or lithium hydroxide. Other combinations of gases and absorbents for the gases are of course operable in this invention. Advantageously, the enclosure should be essentially free from non-absorbable gases.

Absorbents for the gases may be introduced into the film package in any convenient manner. It is preferred to incorporate the absorbent within a rupturable container, such as glass or a rigid, brittle plastic material such as polystyrene, so that the container may be broken while it is within the sealed film pack. Advantageously, the container is substantially impervious to the gas employed within the enclosure. If desired, the absorbent may be placed within the enclosure prior to, during or after the enclosure has been filled with the absorbable gas. Using this procedure, the enclosure is sealed as soon as possible after the gas and absorbent have been added.

The invention provides reduced pressure in X-ray film packs of the type described above. This reduced pressure should be sufficiently low to allow ambient, normal atmospheric pressure to force the walls of the enclosure against the screen, which is in turn forced into close contact with the film.

The invention is further illustrated in the accompanying drawings.

Figure 1:
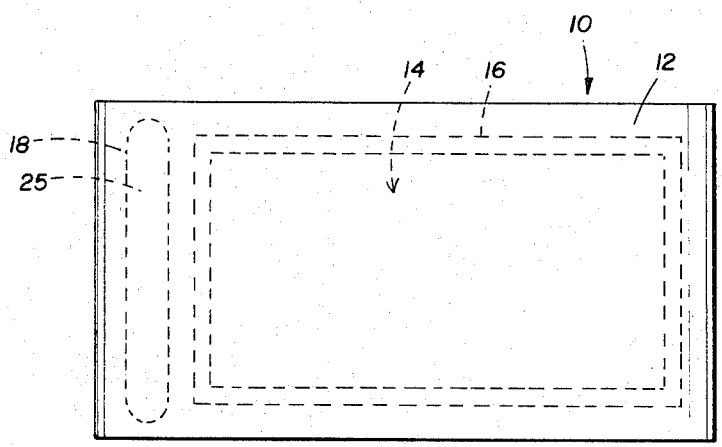
FIGURE 1 is a perspective view of a sealed X-ray ready pack constructed in accordance with the principles of this invention.
Figure 2:
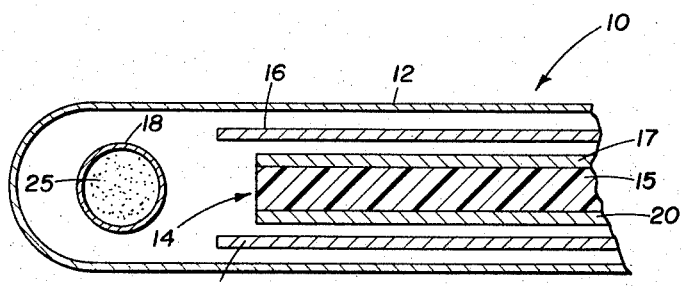
FIGURE 2 is a section view of a ready pack having a photographic element and two intensifying screens therein prior to rupturing the frangible tube of absorbent.

Referring now to FIGURE 1 of the drawings, an X-ray film ready pack indicated generally by 10 comprises an outer sealed envelope or enclosure 12. The enclosure 12 is composed of a flexible opaque, gas impervious material. The enclosure 12 houses X-ray film 14 and at least one X-ray intensifying screen 16. Preferably two intensifying screens 16 and 21 are provided, one on each side of the film 14 as shown in FIGURE 2. Film 14 is composed of a support member 15 which can be made of cellulose acetate or other suitable material. The support member 15 has emulsions 17 and 20 coated on both sides thereof. The emulsion may be coated on one side only, although double coating is the preferred embodiment. Emulsions 17 and 20 are the type suitable for recording X-ray radiation.

Figure 3:
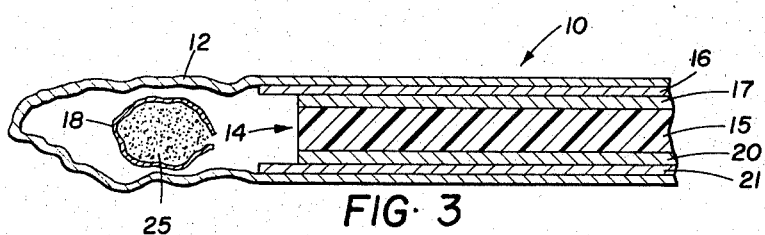
FIGURE 3 is a section view of the ready pack after the frangible tube of absorbent has been ruptured.

The ready pack 10 is thoroughly flushed and filled with an absorbable gas prior to the sealing of the enclosure 12. Carbon dioxide has been found to yield excellent results and is therefore the gas used in the preferred embodiment. Prior to sealing enclosure 12 of the ready pack 10 a frangible tube 18 is inserted into the enclosure 12. The frangible tube can be composed of glass or other suitable material. The frangible tube 18 is filled with a gas absorbent 25, preferably lithium hydroxide. Enclosure 12 is sealed after frangible tube 18 is placed therein. The various parts of the ready pack are then in the structural relationship as shown in FIGURE 2. Due to wrinkling, the intensifying screens 17 and 21 are not in close contact with emulsion layers 17 and 20, as shown in FIGURE 2. The frangible tube 18 is then ruptured and the absorbent 25 therein absorbs the gas in the flexible enclosure 12. Thus, a partial vacuum is created in the ready pack, causing the flexible envelope to become flat and thereby force intensifying screens 16 and 21 into intimate contact with the film 14, susbtantially as shown in FIGURE 3. Upon complete absorption of the gas, atmospheric pressure will force together portions of the walls of enclosure 12 so that they will be substantially flat except where they curve around frangible tube 18.

In operation, the ready pack provides high quality X-ray film images while doing away with the prior art complex structures necessary to obtain such images. An envelope containing film and at least one X-ray intensifying screen is initially flushed with a gas. Thereafter a frangible tube containing an absorbent is inserted into the envelope. The frangible tube is then broken and the gas is absorbed by the absorbent. Due to the partial vacuum within the enclosure, atmospheric pressure forces the intensifying screen into intimate contact with the film, thus assuring a high quality film image. The ready pack is rugged and durable for its intended purposes The rupturable container may be secured within the film pack in any convenient manner, such as in a gas-permeable pocket.

This invention will be further illustrated by the following example.

EXAMPLE

A 10 x 12 inch X-ray film pack was provided having an enclosure in the form of a flat envelope the walls of which were composed of several layers of paper and polyolefin film, including an opaque paper layer. A cellulose triacetate support having a high contrast silver bromoiodide X-ray emulsion coated on both sides of the support was placed in the enclosure with lead foil intensifying screens overlying the emulsion coatings in the manner shown in the drawings. A enclosed glass tube 4½ inches long and ⅛ inch in diameter filled with lithium hydroxide was placed inside the package. Dry Ice was dropped into the package and after a few minutes, when the envelope was filled with carbon dioxide, the package was sealed. The glass tube was then broken and the puffiness of the package was quickly reduced. The lithium hydroxide had absorbed carbon dioxide in the package and atmospheric pressure forced the walls of the package against the intensifying screen and the film. The intensifying screen is held in close contact with the film indefinitely. Upon exposure to X-ray radiation, the element provided in this example was found to have excellent photographic properties due to the close contact between the film and intensifying screen. The image obtained was free from the defects customary when similar elements are exposed where the intensifying screen is not in close contact with the X-ray film.

The invention has been described in detail with particular reference to preferred embodiments thereof but it will be understood that variations and modifications can be effected within the spirit and scope of the invention as described hereinabove and as defined in the appended claims.

We claim:
1. An X-ray film pack comprising:
   (a) a sheet of material for recording X-ray radiation;
   (b) an X-ray intensifying screen overlying said sheet;
   (c) an enclosure for said sheet and screen which is transparent to X-ray radiation but substantially opaque to other radiation to which the material is sensitive, said enclosure being substantially impervious to ambient gases;
(d) said enclosure being filled with an absorbable gas; and
(e) said enclosure containing a rupturable container having therein a material which is an absorbent for said gas.

2. An X-ray film pack comprising:
(a) a photographic silver halide film suitable for recording X-ray radiation;
(b) a flexible X-ray intensifying screen for said film overlying at least one side of said film;
(c) a substantially flat, flexible enclosure for said film and screen which is transparent to X-ray radiation but opaque to other radiation to which the film is sensitive, said enclosure being impervious to ambient gases;
(d) said enclosure being filled with an absorbable gas, and essentially free from non-absorbable gases; and
(e) a rupturable container within said enclosure containing a sufficient quantity of a material which is absorbent for said gas to completely absorb said gas when the container is ruptured.

3. An X-ray film pack comprising:
(a) a photographic element having a silver halide emulsion layer coated on both sides of a flexible support, said emulsion being suitable for recording X-ray radiation;
(b) a flexible X-ray intensifying screen completely overlying the said emulsion layers;
(c) an opaque, gas impervious enclosure for said film and screen, said enclosure being substantially flat in figuration;
(d) said enclosure being filled with carbon dioxide and substantially free of other gases; and
(e) a rupturable gas impervious container within said enclosure containing an absorbent selected from the group consisting of lithium hydroxide, barium hydroxide and calcium hydroxide, said absorbent being present in sufficient quantity to absorb essentially all of the carbon dioxide gas upon rupturing said container.

4. The process of providing intimate contact between a photographic silver halide film suitable for recording X-ray radiation and a flexible X-ray intensifying screen which comprises placing said photographic film and screen in overlying relation within an enclosure substantially impervious to gases; incorporating within said enclosure a rupturable container having an absorbent material therein; filling the enclosure with an absorbable gas; sealing the container; and, rupturing the container whereby the gas within the enclosure is absorbed to lower the pressure therein and atmospheric pressure forces the walls of the enclosure against the intensifying screen and into intimate contact with photographic film.

References Cited

UNITED STATES PATENTS

| 3,128,135 | 4/1964 | Ege | 206—47 |
| 3,240,936 | 3/1966 | Masi et al. | 250—68 |
| 3,291,984 | 12/1966 | Wasser | 250—68 |

FOREIGN PATENTS 909,779 11/1962 Great Britain.

RALPH G. NILSON, *Primary Examiner.*

A. L. BIRCH, *Assistant Examiner.*

U.S. Cl. X.R.

206—62